May 12, 1936.  C. J. GORDON  2,040,255
ELECTRIC BATTERY
Filed Sept. 11, 1934
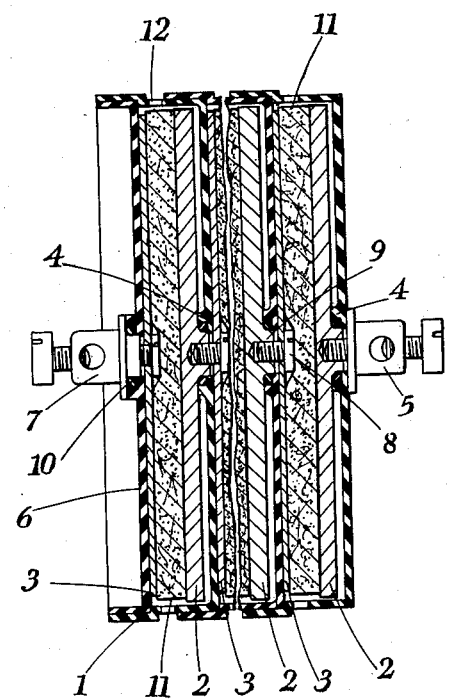
INVENTOR
Christian Jensen Gordon
BY Byrnes, Stebbins & Blenko
his ATTORNEYS Patented May 12, 1936

2,040,255

UNITED STATES PATENT OFFICE 2,040,255

ELECTRIC BATTERY

Christian Jensen Gordon, London, England

Application September 11, 1934, Serial No. 743,545
In Great Britain October 11, 1933

2 Claims. (Cl. 136—111)

This invention relates to electric primary batteries of the kind in which cell units are built up to form a pile.

Each unit consists of a shallow cup of insulating material, preferably with a flat base, and of an electrode on each side of the base, these electrodes being formed as plates and connected by a conductor passing through a hole in the base. The cup is adapted to hold or sufficiently enclose the electrolyte and to fit into a similar cup on each side, so that a number of the units can be superposed to build up the battery. The two electrodes carried by each cup are not included in the same cell; one forms a part of the cell within the cup and the other forms a part of the cell in the adjacent cup. On the outside of the base of the cup at one end of the battery, the electrode can be omitted, being replaced by a terminal connection. At the other end of the battery a similar arrangement may be adopted or a special unit may be used, the cup being replaced by a disc with an electrode on one side only and a connection through to a terminal.

It will be understood that in an arrangement of the kind indicated above, it is important that the electrolyte material should not be permitted to gain access to the two electrodes which are joined together as otherwise local cells will be formed giving rise to the production of E. M. F.'s in opposition to that given by the battery. By the present invention, we provide improved means for joining together the two electrodes placed on opposite sides of the base of the cup, and we employ for this purpose a screw member which draws the two electrodes towards each other and into tight contact with the base of the cup. A packing member may be interposed between the base and one or both of the electrodes to ensure the obtaining of tight joints, if necessary. As the two electrodes which are joined together on opposite sides of the base of the cup are of different materials it follows that the screw member must be of a material different from one of the electrodes. If the electrolyte material is allowed to gain access to the contact surfaces of the screw member and the electrode which is made of a different material from that of the screw member, corrosion of the latter will take place and a local cell will be formed by the electrolyte and the surfaces of the screw member and electrode in contact. To overcome this difficulty the connecting screw member can be made of the same material as one of the electrodes and arranged to enter a tapped hole formed in the other electrode and the arrangement is such that the different metals are in contact with each other only in the enclosed space formed between the two electrodes and the wall of the aperture in the base of the cup.

In the accompanying drawing, one form of construction of a battery in accordance with the present invention is shown. The units, of which the battery is built up, are circular in shape and the drawing shows a central section.

The shallow cup 1 made of insulating material forms the basis of each unit. It has a stepped wall as shown so that the base of one cup can fit within the outer part of the next cup. The cups can be made of any one of numerous mouldable insulating compositions and will usually have a comparatively thin wall as shown. They will be a tight fit in each other and this tightness will generally serve to hold the units together, although a frame or container may be provided in some cases. The electrodes 2 and 3 are mounted on opposite sides of the base of the cup and are connected together through an aperture formed in a boss 4 in the base of the cup. The cup 1 with the connected electrodes 2 and 3 form a unit. At the right hand end of the battery, the plate 3 of the unit is replaced by a terminal 5. The unit at the left hand end of the battery could utilize a cup identical with the cup 1 of the other units but it will generally be preferable to replace this by a flanged disc 6 which has an electrode 3 on one side and a terminal 7 on the other side.

It will be seen that a two-cell battery could be built up from a single standard unit and two end units but in general a battery will comprise a number of standard units considerably greater than one.

The electrodes 2, 3 are of different materials and each pair is joined together by a screw 8 which passes through the electrode 3 and through the aperture in the base of the cup 1 and enters a tapped hole in a boss 9 on the center of the rear face of the electrode 2. This screw draws the two electrodes tightly against the faces of the base of the cup and of the boss 4 respectively. To ensure the making of a tight joint, it is preferable to provide a packing such as that afforded by the rubber ring 10 located in a recess in the boss 4. This packing is shown at one side only of the base wall of the cup but could be provided on both sides if required. This would involve some increase in the thickness of the wall or of the boss thereon and would accordingly make the battery of an increased size. In general, the single packing will suffice.

It is preferable to make the screw 8 of the same material as the electrode 3. If this is not done, it will be necessary to protect the places of contact between the screw 8 and the electrode 3 from the action of the electrolyte. This can be done by a layer of insulating and chemically resistant varnish applied to the head of the screw and the adjacent part of the electrode 3.

In the arrangement illustrated, the space between the electrodes 2 and 3 in each cell is occupied by a pad of absorbent material 11 which is in contact with the two electrodes. This pad may advantageously be formed of wood wool or other loosely felted cellulose fibrous material. The pad 11 may be charged with electrolyte material in the dry form and can then be put into action simply by immersion in water when required for use. The electrolyte may be mixed with glycerine so as to assist the pad in retaining it and the pad may then be desiccated and placed in the cell. A battery built up with pads of this kind can be rendered active by temporary immersion in water which has access to the interior of the cell through holes 12 in the wall of each cup 1. The surplus water is drained off and the cell then remains active until substantially all the water has been electrolyzed or evaporated. It can then be rendered active again by a further immersion and this can be repeated until the electrolyte material has been used up within practical limits. Instead of charging each pad 11 initially with electrolyte material, this can be supplied by dipping the battery into an appropriate solution.

Each cell can contain, in addition to electrolyte, an appropriate depolarizing agent.

It is preferred to use, as one of the electrodes, magnesium and, for the other, either carbon or copper or silver. The last mentioned will usually be provided in the form of a thin layer of silver on a copper support. When copper is used, either as the electrode or as the support, it may be in the form of gauze. It will then be provided with a solid metal centre to facilitate the fixing and the making of a tight joint.

For the electrolyte, it is preferred to use a solution of potassium iodide.

When using magnesium, the form of cell is particularly advantageous owing to the possibility, which it provides, of giving a limited supply of active electrolyte to the battery at each immersion. This prevents the corrosion of the magnesium electrode from proceeding continuously after the battery has been put in the initial working condition.

It will be seen that in the method of joining together the electrodes 2 and 3 as described above, the electrolyte material will be prevented from gaining access to the space between these electrodes and accordingly from gaining access to the surfaces of the screw and of the electrode 2 which are in contact in that space. By this means, it is ensured that local cells are not formed and corrosion of the connecting screw does not take place. The screw method of attachment also has the further advantage that it facilitates the assembly of the parts.

It is to be understood that the term "cup" used herein is to be read as meaning a container having a base and a side wall standing up from the base. It is not essential that the base and side wall should be integral. They could be made as separate parts held closely together in the assembly; for instance, the base might be a flat plate and the side wall a circular ring fitting on the edge or outer part of the base. In general however the integral construction will be found preferable.

I claim as my invention:—

1. An electric primary battery of the pile type comprising two insulating cups the one fitting into the other, one of the cups having an aperture in its base, an electrode of one material disposed on one side of the said base, an electrode of another material disposed on the other side of the said base, and a screw member made of the same material as one of the electrodes and passing through an aperture in the said electrode and through the aperture in the base and entering a tapped hole in the other electrode, the arrangement being such that the screw member and the electrode made of a material different from that of the screw member, are in contact only in the enclosed space bounded by the two electrodes and the wall of the aperture in the base, which space is closed in liquid-tight manner by the action of the screw member.

2. An electric primary battery of the pile type comprising two insulating cups the one fitting into the other, one of the cups having an aperture in its base, an electrode disposed on one side of said base, an electrode disposed on one side of said base having a tapped hole, a boss on the base surrounding the aperture therein and the boss on the electrode, a recess in one of the bosses, a packing member in the recess and disposed between the two bosses, a second electrode disposed on the opposite side of the base to the first electrode, and a screw member passing through an aperture in the second electrode and the aperture in the base and entering the tapped hole in the boss on the first electrode, the screw member serving to secure the two electrodes to the base of the cup and to compress the packing member between the bosses to form a liquid-tight joint at these parts and also to form a liquid-tight joint between the screw member and the second electrode.

CHRISTIAN JENSEN GORDON.